United States Patent
Staiger

(10) Patent No.: US 7,140,026 B2
(45) Date of Patent: Nov. 21, 2006

(54) MESSAGE PREPROCESSING METHOD AND DEVICE FOR COMPUTER NETWORK COMMUNICATIONS

(75) Inventor: Dieter E. Staiger, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 10/004,471

(22) Filed: Dec. 4, 2001

(65) Prior Publication Data

US 2002/0073243 A1    Jun. 13, 2002

(30) Foreign Application Priority Data

Dec. 9, 2000    (EP)    .................. 00127047

(51) Int. Cl.
*G06F 3/00* (2006.01)
(52) U.S. Cl. ........... 719/313; 718/100; 709/250
(58) Field of Classification Search ............ 370/321; 709/200, 250; 719/313, 316; 712/29; 718/100
See application file for complete search history.

(56) References Cited

U.S. PATENT DOCUMENTS

| | | | | |
|---|---|---|---|---|
| 4,625,308 A | * | 11/1986 | Kim et al. | 370/321 |
| 5,590,283 A | * | 12/1996 | Hillis et al. | 712/29 |
| 5,710,924 A | * | 1/1998 | Ayoub et al. | 719/313 |
| 5,734,903 A | * | 3/1998 | Saulpaugh et al. | 719/316 |
| 5,832,397 A | * | 11/1998 | Yoshida et al. | 701/29 |
| 6,065,037 A | * | 5/2000 | Hitz et al. | 709/200 |
| 6,243,748 B1 | * | 6/2001 | Arai | 709/223 |
| 6,948,186 B1 | * | 9/2005 | Brosey | 725/151 |

* cited by examiner

*Primary Examiner*—William Thomson
*Assistant Examiner*—G. Lawrence Opie
(74) *Attorney, Agent, or Firm*—Douglas W. Cameron; Anne VAchon Dougherty

(57) ABSTRACT

The present invention relates to a method and device for communicating with remote units over at least one data network and with at least one dedicated CPU. The message processing device according to the present invention includes a first execution unit for receiving a message to be processed and determining the kind of treatment to be performed with the received message, a second execution unit for performing the determined treatment, and a third execution unit for presenting the result of the message processing to be forwarded to a destination unit.

14 Claims, 8 Drawing Sheets

MESSAGE PREPROCESSING METHOD AND DEVICE FOR COMPUTER NETWORK COMMUNICATIONS

TECHNICAL FIELD

The present invention relates to a method and a circuit arrangement for communication within and across networks. Particularly, the present invention relates to a method and device for communicating with remote units over at least one data network and with at least one dedicated CPU (central processing unit).

BACKGROUND ART

Computer systems of all different sizes, from embedded systems over personal computer and workstations to even large scale computer systems, are typically connected to one or more networks. Through the networks the computer systems are able to collect information from different mostly remote systems for further computation. The information might contain parameters describing the state of operation of the remote systems which are meant to be controlled or monitored by the computer system receiving the information.

An Electronic Control Unit (ECU) in a modem automobile is an example for such an arrangement. The ECU may be connected to a plurality of real-time networks, e.g., several individual CAN (Controller Area Network) busses or other multiple purpose networks, like multimedia-networks, such as MOST (Media Oriented Systems Transport), i.e., an optical bus system used in automobiles, or IEEE1394 (Firewire).

During operation, the ECU executes an application program for controlling the remote systems. At the same time, it has to monitor the various busses and networks in order to select and retrieve such information from the data being transmitted which contains parameters required for the application programs in progress. Commonly, multiple busses are directly attached to a Central Processing Unit (CPU) included in the ECU. Monitoring the busses, selecting and retrieving the information of interest causes a processing load of momentous significance for the overall performance of the ECU.

The processing load is particularly generated by routing, gateway, bus bridge and filtering functions which have to be performed by the ECU concurrently to the execution of the application program.

Typically, in smaller computers and embedded systems the processing load generated by routing, gateway, bus bridge and filtering functions should be minor, leaving the majority of computing performance to the target application that has been assigned to the specific CPU in the first place.

As opposed to local area networks (LAN), such as Ethernet, real-time bus systems, like the CAN bus system, are transporting a comparable small amount of data per data packet. This feature is significant to ensure the real-time capability of the bus system, i.e., the capability of a system to respond to stimuli within some small upper limit of response time, typically milliseconds or microseconds. However, real-time bus systems allow to transmit a comparable high amount of data packets within a given period of time. Thus, real time bus systems generate a very high interrupt rate for a CPU connected to it, which needs to select and retrieve relevant data packets. As an example, four independent CAN bus systems attached to a processing system using a PowerPC 403 CPU running at 50 MHz, may cause a interrupt rate inducing a CPU load well above 50% utilization in average, that is only caused by interrupts triggered by the CAN bus systems.

In state of the art devices, standard computing systems, such as single or multiple (parallel) processors, implemented following the RISC (Reduced Instruction Set Computer) or CISC (Complex Instruction Set Computer) architecture, are used to perform intercommunication applications and tasks.

Although state of the art computing systems might be used for the intercommunication applications and tasks, providing sufficient processing performance becomes a serious issue, in case multiple bus adapters are connected via the computing system. Calculating the worst-case interrupt rate produced by, e.g., four 1 Mbps (megabits per second) bus-adapters may reach a interrupt rate per second far beyond the computing capabilities a present standard processor can provide.

The fact that a comparable high amount of data packets has to be dealt with influences significantly the demand on performance for processing systems in the area of intercommunication applications. Put into practice, the aforementioned circumstance is leading to an increasing demand on processing capabilities in contrast to the requirements defined by the other applications which are executed on the computing system.

To overcome the shortage of computing capabilities the system clock frequency could be doubled. As a result of that, the power dissipation typically doubles as well, causing problems, e.g., with respect of cooling the system. Another solution could be found by adding more processors to the system. All performance demanding bus related tasks could be executed on an additional processor within the system. This, however, results in higher manufacturing costs, since an additional processor has to be provided.

Another method used by real-time bus controllers is to implement so-called "filter registers." Filter registers are complemented by hardware comparators to bring some "relief" for the CPU(s) by reducing the interrupt rate and reducing time consuming message address compare operations. The message IDs to be filtered are stored in specific registers, e.g. 16 identifiers, and are compared with the message approaching on the bus. Only messages having matching identifiers are forwarded to the CPU.

From U.S. Pat. No. 5,832,397 an integrated communications apparatus is known for use in a vehicle control system for monitoring and controlling operational status of a plurality of vehicle systems, each vehicle system having a local control unit for controlling operation thereof, said local control units being accessible by means of a data communication line, said integrated communications apparatus comprising: at least one memory unit, a central processing unit for receiving and processing signals transmitted from said local control units, which signals are indicative of operational status of said plurality of vehicle systems, according to control programs stored in one of said at least one memory unit, and for generating control signals for transmission to said plurality of vehicle systems by means of said data communication line, and a programmable subprocessor for controlling communications between said central processing unit and said local control units by means of said data communication line, according to at least one of said control programs stored in one of said at least one memory unit.

OBJECT OF THE INVENTION

Starting from this, the object of the present invention is to provide a method and a device that improves the data processing between at least one network and at least one CPU.

SUMMARY OF THE INVENTION

The foregoing object is achieved by a method and a system as laid out in the independent claims. Further advantageous embodiments of the present invention are described in the sub claims and are taught in the following description.

The method focuses on message processing in a system for communicating with remote units over at least one data network and with at least one dedicated CPU. First, a message to be processed is received and it is determined the kind of treatment to be performed with the received message. Then message specific information specifying the contents of the received message and the determined treatment of a received message are stored into a first set of registers. In the following the first set of registers is monitored in order to start processing a message once a process execution unit is available for processing. Then the determined treatment gets performed. Meanwhile, the first set of registers are monitored in order to start presenting the result of the message processing once the processing of the message is complete. Finally, the result of the message processing is presented to be forwarded to a destination unit.

The message processing device according to the present invention for communicating with remote units over at least one data network and with at least one dedicated CPU includes a first execution unit for receiving a message to be processed and determining the kind of treatment to be performed with the received message, a second execution unit for performing the determined treatment, and a third execution unit for presenting the result of the message processing to be forwarded to a destination unit.

In further embodiments, the second execution unit additionally comprises one or all of the following features: a first set of registers for storing message specific information specifying the data contents and the determined treatment of a received message, at least one process execution unit having access to the first set of registers for performing the determined treatment and/or a second set of registers being connected the at least one process execution unit for storing information needed by the process execution unit. The device might be configured to monitor the first set of registers in order to start processing a message once a process execution unit is available for processing and or to monitor the first set of registers in order to start presenting the result of the message processing once the processing of the message is complete.

Preferably, the device is integrated in an intercommunication processing system for communication within and across networks. The system further comprises a switchboard device for providing a communication connection to the at least one data network and to the at least one dedicated CPU, whereby the switchboard comprises a multiplexer on one hand connected to the first and third execution unit and on the other hand being prepared to be connected to several bus adapters and the CPUs and/or an interrupt bus on one hand connected to the first execution unit and on the other hand being prepared to be connected to several bus adapters and the CPUs.

An advantage of the method and device according to the present invention is relieving a processing unit communicating with multiple networks from a high interrupt rate induced by the amount of data packets being transmitted over the networks.

BRIEF DESCRIPTION OF THE DRAWINGS

The above, as well as additional objectives, features and advantages of the present invention, will be apparent in the following detailed written description.

The novel features of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENTS

Figure 1:
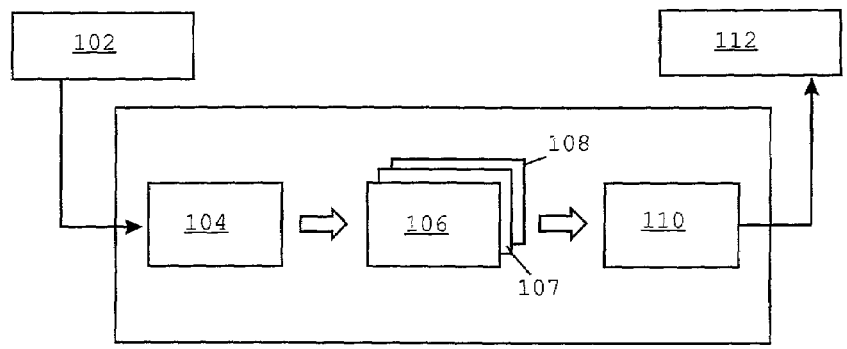
FIG. 1 shows a high level block diagram of an intercommunication preprocessor according to the present invention.

FIG. 1 shows a high level block diagram of an intercommunication preprocessor 100 according to the present invention. The intercommunication preprocessor 100 (IPP) performs three different kinds of processes, each of which is executed on a separate execution unit.

The first kind of process is called "initializing process." It analyses an incoming message, illustrated as block 102 in FIG. 1, and determines its further processing based on configuration data dedicated to the intercommunication preprocessor 100 and information encoded in the incoming data, as it will be explained in greater detail later on. The initializing process (IP) is performed by an IP execution unit 104.

After the initializing process, the message is subject of the second process that is called "dynamic process". The dynamic process (DP) performs the task which has been determined by the initializing process. As indicated by staggered boxes 106, 107 and 108, three DP execution units are provided to perform the dynamic process. This is done sequentially or concurrently depending on the tasks to be performed. All tasks to be performed on one incoming message which can be split into subtasks that can be performed concurrently are marked accordingly. Later, during the dynamic process more than one execution units might be used to perform the tasks in parallel. Hence, the topology of the present intercommunication preprocessor 100 is not limited either to parallel computing or sequential computing, it is able to perform either way depending on the actual task to be executed.

In other words, in differentiation to known state of the art processor topologies, the intercommunication preprocessor architecture is not identifiable operating in a fixed processor architecture. It rather is triggered by the respective job to be executed. Thus, the logical intercommunication preprocessor system architecture is continuously adjusting its processor topology dynamically to the actual requirements.

The third kind of process is called "presentation process." The presentation process (PP) is performed on a dedicated PP execution unit 110 which monitors the dynamic processes executed on the multiple DP execution units. After the completion of the tasks performed during the dynamic process the PP execution unit outputs a message 112 as a result of the computation of the incoming message 102.

Figure 2:
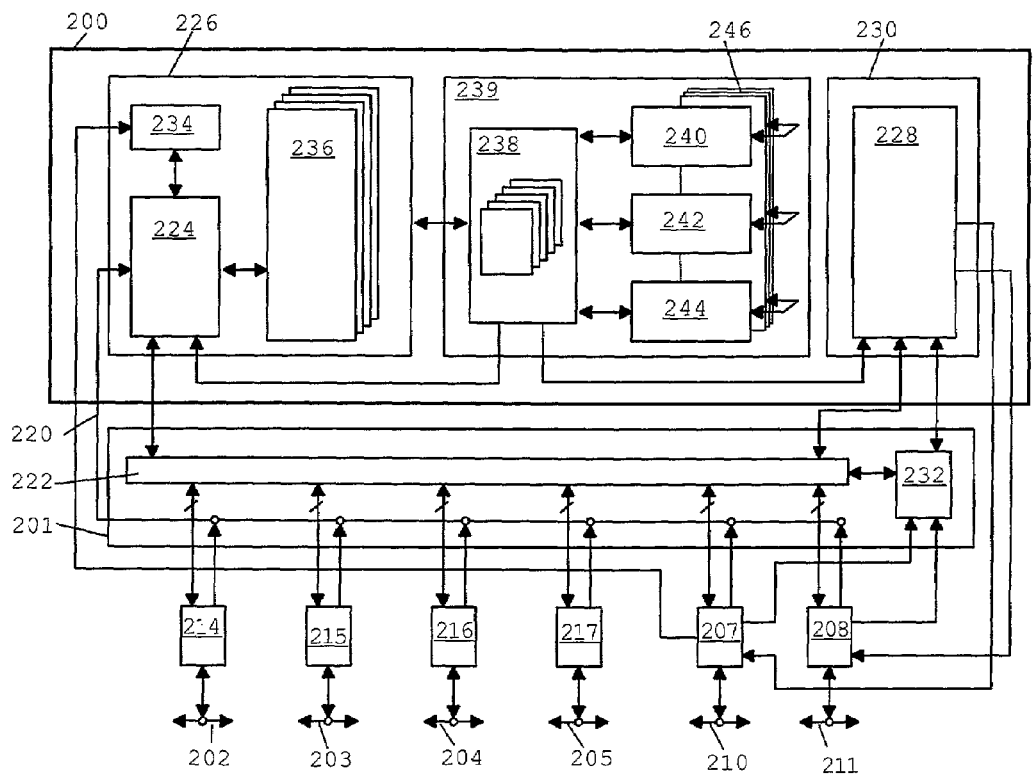
FIG. 2 shows a high level block diagram of an intercommunication preprocessor according to the present invention.

With reference now to FIG. 2, there is depicted a high level block diagram of an intercommunication preprocessor 200 according to the present invention. The shown intercommunication preprocessor 200 is connected to a switchboard 201 which is designed to connect four individual CAN-busses 202 to 205 and in addition a first and a second independent CPU 207 and 208. The first and the second CPU 207 and 208 are providing connections to first and second additional bus systems 210 and 211, respectively. The additional first and second bus systems 210 and 211 might be different from each other and formed by, e.g., a FireWire system, i.e., a high performance serial bus specified according to IEEE 1394, or any other kind of multimedia bus, such as, e.g., MOST (Media Oriented Systems Transport).

Connecting up to four CAN busses and one or two CPUs together represents a typical network requirement used in modem automobiles. However, the intercommunication preprocessor according to the present invention is neither limited to this particular bus systems, the specific number of busses nor to the number of CPUs connected to it.

Each of the four CAN-busses 202 to 205 is connected to one of the respective bus adapters 214 to 217. The bus adapters 214 to 217 might be formed by standardized CAN controllers providing connections to the respective CAN-busses 202 to 205 via CAN-C or CAN-B physical layers. On one hand, each bus adapter 214 to 217 has a connection to an interrupt request bus 220. on the other hand, each bus adapter 214 to 217 possesses a connection to a multiplexer 222. The connections to the multiplexer 222, however, might be formed by a bus providing sets of conductors, such as wires, PCB (printed circuit board) tracks or connections to an integrated circuit, to connect the bus adapters 214 to 217 with the multiplexer 222.

Corresponding to the four bus adapters 214 to 217, both CPUs 207 and 208 are also connected to the interrupt bus 220 and to the multiplexer 222. The multiplexer 222 further shows a connection to a control engine 224 of an IP (initializing process) execution unit 226 and to a transmission unit 228, which is included in a PP (presentation process) execution unit 230. A controller 232 controls the multiplexer 222 in response to control signals transmitted over dedicated control signal lines received by the first CPU 207, the second CPU 208 and the transmission unit 228, respectively. The arrangement as drawn above enables the multiplexer to provide connections from the bus adapters 214 to 217 and the CPUs 207 and 208 to either the control engine 224 or the transmission unit 228.

The IP execution unit 226 further comprises an IPP preset interface 234 and an IPP storage sub system 236. The IPP preset interface 234 can be initialized by the first CPU 207 and is able to exchange control information with the control engine 224, whereas the IPP storage sub system 236 is provided for storing control information needed for the computation of messages received from either one of the bus adapters 214 to 217 or one of the CPUs 207 and 208.

Besides having a connection to the multiplexer 222, the control engine 224 is connected to the interrupt bus 220 and further possesses a connection to execution tag registry 238 which is included in a DP (dynamic process) execution unit 239 and store data needed for the computation of the received messages. The execution tag registry 238 itself is connected to a first, a second and a third execution unit 240 to 244 which can access a register pool 246 for storing data and for exchanging data among the execution units 240 to 244. It is acknowledged that the number of execution units is not limited to three, there might be any number of execution units provided in the intercommunication preprocessor according to the present invention.

From the execution tag registry 238 information can be transferred through a dedicated data link to the transmission unit 228. From there the information can either be supplied to the multiplexer 222 or directly to the first or second CPU 207 and 208.

In other words, the PP execution unit 230 is continuously monitoring and interpreting the execution tag registry 238. As soon as particular data field is decoded to a notification having the meaning 'overall process complete', the PP execution unit will be triggered and a special 'Presentation Processing' procedure will be initiated in order to complete the overall process function.

The Presentation Process procedure is defined by an overall system specification. However, typical jobs are functions like: getting or generating a destination message address, getting and assembling a new message from the data being the result of the processing of a message, issuing the new message to a specified target system and/or transmitting the message to register files or a FIFO (first-in first-out queue) or priority sorting the individual exit message queues.

Complex Presentation Processing functions can be organized by using process driven topology to build up an very effective system.

The execution tag registry is accompanying an intercommunication preprocessor process until its completion. During this time, it is continuously being updated by feedback. The number of dynamic processes having the state "pending" may increase and decrease during the entire intercommunication preprocessor process. At the time, all execution flags within the execution tag registry are cleared and the Presentation Process will take over to finalize the overall IPP process. A post execution unit will take over the result contained in the execution tag registry and the data generated by the last finalized DP execution unit.

Then, it will use this information to assemble a new message. The execution tag registry as well as the last DP execution unit will be unloaded and released.

The PP execution unit 230 will finalize the message and push the 'resulting' message into an output pipeline. An invalid message may be dismissed or rejected at this point of time upon software control according to a specification in an intercommunication preprocessor configuration register. Upon specific intercommunication preprocessor system requirements, the PP execution unit can perform a 'priority sort' on the messages stored in the output pipeline. Immediately hereafter, a request to the respective bus adapter or an interrupt to the CPU will be issued. The respective bus adapter will start and execute the arbitration and will clear the corresponding output pipe upon the reception of a successful transmission message or, in case of the CPU, a interrupt service routine completed message.

The pipe overflow handling is defined in an intercommunication preprocessor system configuration registers. In case of a pipe overflow the intercommunication preprocessor could stop initializing execution units and issue an interrupt to CPU notifying the CPU of the overflow condition.

The controller 232, the multiplexer 222 and the interrupt bus 220 are forming the switchboard 201. The switchboard 201 is a functional extension to the actual intercommunication preprocessor allowing to improve the advantageous system characteristic. The switchboard 201 hardware function is inserted between the intercommunication preprocessor, the CPUs 207 and 208 and the diverse bus adapters 214 to 217 as shown in FIG. 2.

The switchboard 201 is a multiplexing scheme controlled either by one of the CPUs 207 and 208 or the intercommunication preprocessor 200. This allows the CPUs 207 and 208 to use the functionality of the intercommunication preprocessor 200. For example, a message generated by one of the CPUs 207 and 208 has to be broadcasted to several CAN busses 202 to 205 identically. In this case, the message is multiplexed by the switchboard 201 to the intercommunication preprocessor 200, then, the intercommunication preprocessor 200 processes the message and initiates immediate distribution. This procedure significantly saves time, since the intercommunication preprocessor 200, specialized to operate this tasks, will require only a fraction of processing time in comparison to a master CPU formed by one of the CPUs 207 and 208. Furthermore, the master CPU only has to execute one single message operation, in case the message needs to be computed before forwarding, which saves processing time as well.

Figure 3:
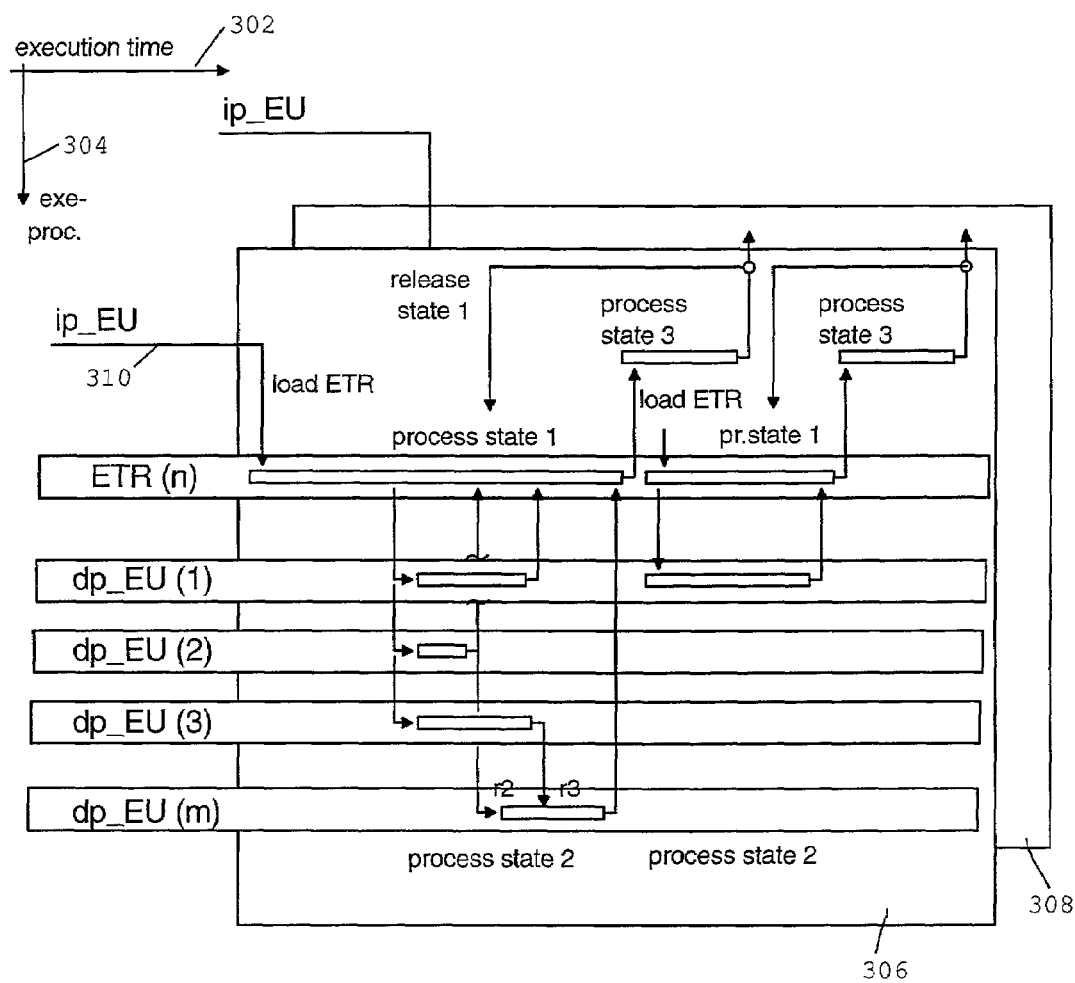
FIG. 3 shows a diagram illustrating concurrent process execution according to the present invention.

FIG. 3 shows a diagram illustrating concurrent process execution according to the present invention. The x-axis 302 illustrates the progress in time, whereas the y-axis 304 illustrates the seizure of the intercommunication preprocessor resources, namely, the one of the DP execution units and storage space in the execution tag registry, as described with reference to FIG. 2.

A rectangular frame 306 encloses one storage space in the execution tag registry ETR(n) and all DP execution units which are involved in the processing of one particular incoming message, whereby the letter "n" denotes that a random storage space of the execution tag registry might be used. Correspondingly, the numbering of the DP execution units "1", "2", "3" and "m" illustrates that there are up to "m" DP execution units, whereby "m" is an integer number greater than three. However, it is acknowledged that the number of parallel DP execution units can be chosen in accordance with the actual performance needs, without departing from the underlying idea of the present invention.

After one incoming message has been processed, another incoming message can be computed by using the same storage space of the execution tag registry. At the same time, different other messages can be processed by using different storage spaces in the execution tag registry, as indicated by the second staggered rectangular frame 308. However, typically more than two messages are processed concurrently.

The processing of an incoming message by the DP execution units gets initiated by the IP execution unit (of FIG. 2) as denoted by the arrow 310. The IP execution unit allocates a storage space of the execution tag registry and stores all information needed by the DP execution units to perform the specified treatment on the incoming message. After the initialization, the IP execution unit immediately processes the next incoming message available. Correspondingly, the IP execution unit allocates another storage space of the execution tag registry and stores all information needed by the DP execution units to perform the specified treatment on the next incoming message.

After the initializing process (process state 1) the particular storage space of the execution tag registry stays allocated until the processing of the message is complete. In the example shown in FIG. 3, three different DP execution units start processing the incoming message concurrently (process state 2). This is done by setting respective flags in the occupied storage space of the execution tag registry, so that an available DP execution unit can automatically pick up the task and start processing. The concept of the present invention, that all processes that are ready to be processed are offered to the DP execution units, ensure a flexible way of using the resources of the intercommunication preprocessor. Depending on the particular task to be performed and the workload, the intercommunication preprocessor processes a particular task sequentially or in parallel or in a combination of both. After the DP execution unit dp_EU(2) has concluded its computing another process is started on DP execution unit dp_EU(m), which waits for results from DP execution unit dp_EU(3). Only after all involved DP execution units are done with their jobs, the presentation process (process state 3) reads the result of the computation and transmits it to the busses or forwards it to the CPU (cf. FIG. 2). At the same time the storage space of the execution tag registry gets released and can be reused for another message to be performed, as depicted by a new entry in the same storage space and a new "load ETR" process.

Figure 4:
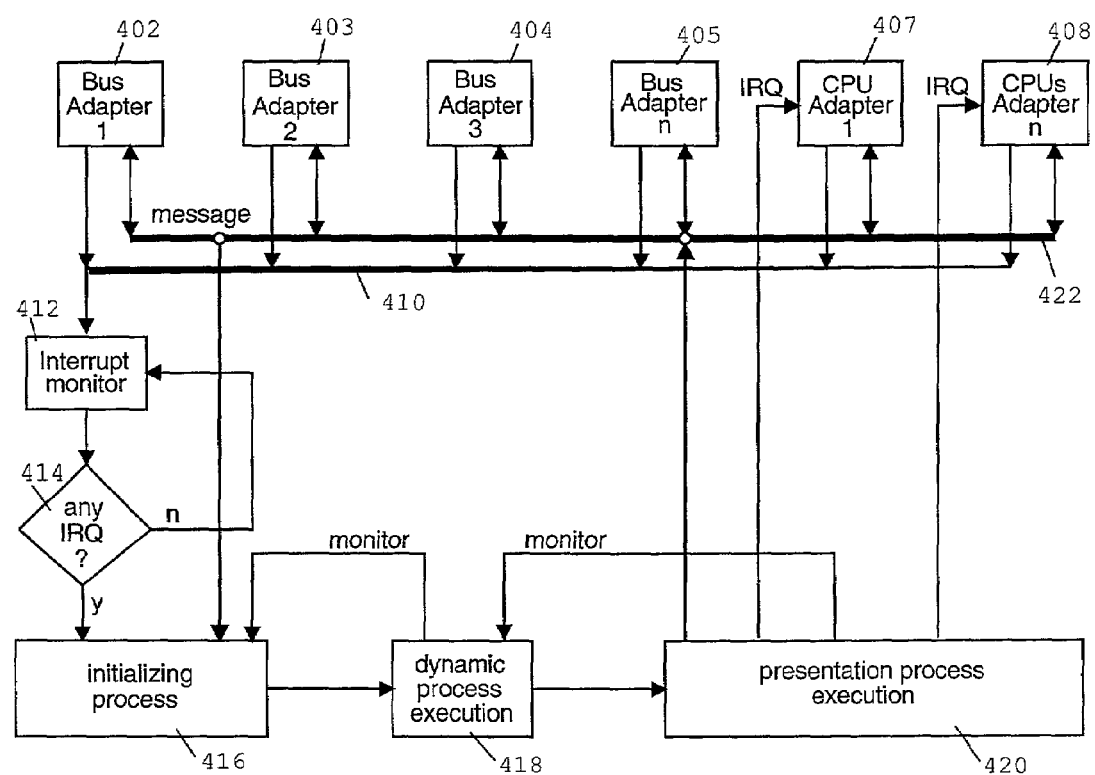
FIG. 4 shows a flow chart illustration the message processing of an intercommunication preprocessor according to the present invention.

Now with reference to FIG. 4, there is depicted a flow chart illustration the message processing of an intercommunication preprocessor according to the present invention. The process is initiated by a one of the bus adapters 402 to 405 or one of the CPU adapters 407 and 408 by sending an interrupt request over an interrupt bus 410 to an interrupt monitor illustrated by block 412. The interrupt monitor catches the interrupt and initiates further processing. This is done by a determination of whether or not any interrupt request (IRQ) has been issued as depicted by block 414.

If not the process returns to block 412, if yes, the process passes to block 416 illustrates the initializing process that will be explained in greater detail below. The initializing process gathers the message information from the particular unit that has been successful by issuing the interrupt request.

A DP (dynamic process) execution process depicted as block 418 that will be explained in greater detail below monitors the initializing process. In case the DP execution process is able to compute the newly arrived message data, the process and the message information are passed to block 418. Furthermore, the DP execution process itself is monitored by a PP (presentation process) execution process that will be explained in greater detail below. In case the DP execution process completed the computation of the message in progress the monitoring PP will detect the completion and itself will take over the message for further computation. The process is passed to block 420 representing the PP execution process. The PP execution process itself sends an interrupt request to one of the CPUs 407 or 408 and writes the computed message data over a data bus 422 to the respective CPU 407 or 408.

Figure 5:
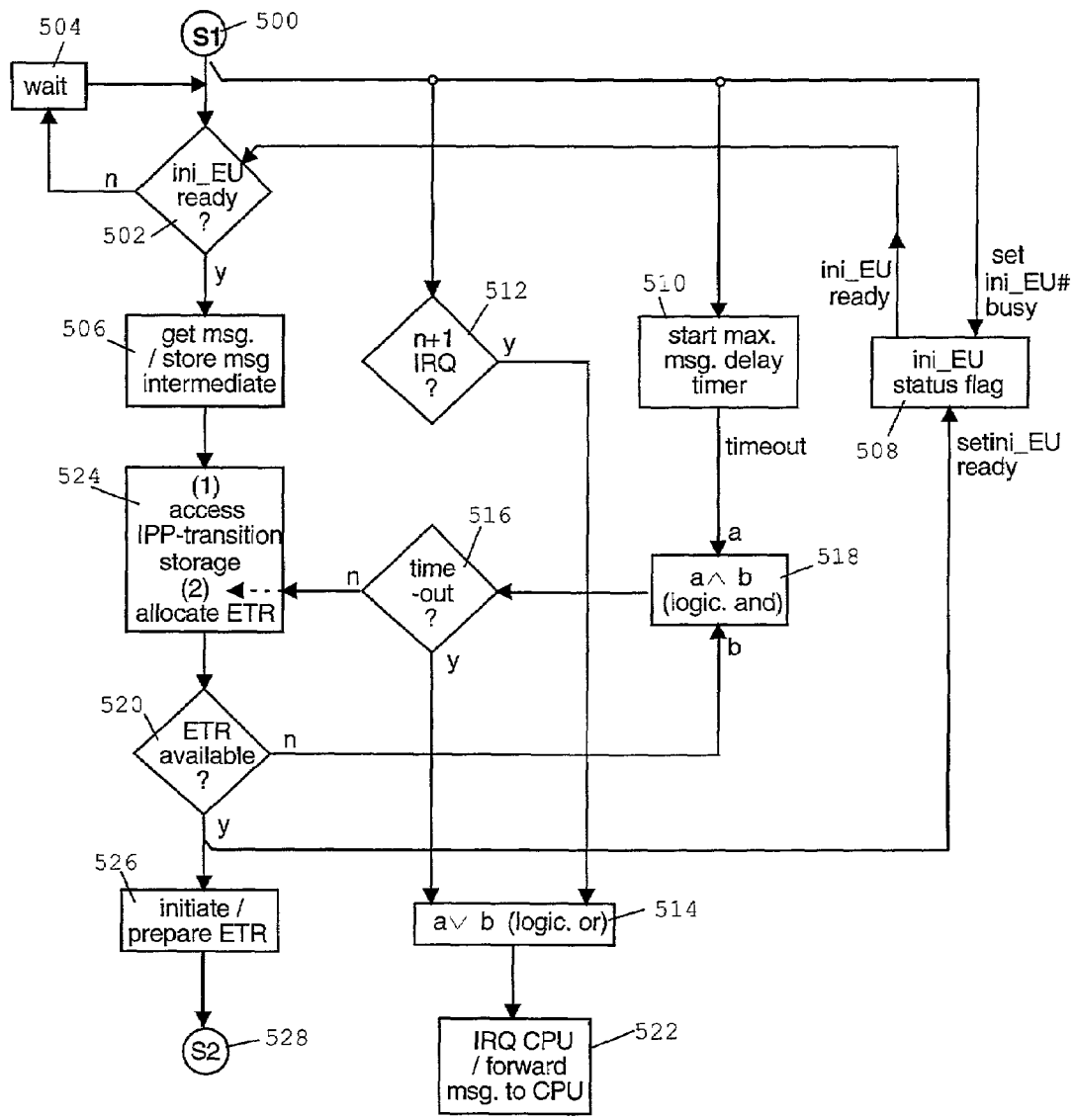
FIG. 5 shows a flow chart illustration the message processing in an initializing process of the message processing as illustrated in FIG. 4.

With reference to FIG. 5, there is shown a flow chart illustration the message processing in an initializing process of the message processing as illustrated in FIG. 4. Block 500 illustrates the starting point of the present process which is reached when the process shown in FIG. 4 is passed to block 416, the initializing process. From block 500 the process immediately proceeds to a determination illustrated as block 502 of whether or not the initializing process execution unit (cf. FIG. 2) is ready for accepting message data. If not, the process returns to block 502 after it was delayed for a predetermined period of time by a wait state illustrated by block 504. If yes, the process passes to block 506 indicating that the message is retrieved and intermediately stored.

The determination of block 502 gets the information of whether or not the initializing process execution unit is ready for accepting message data from status flags associated to the IP execution unit represented by block 508. After the IP execution unit has accepted new message data to process the status flags are set to busy. At the same time, an internal counter counting the number of interrupt requests is increased and a delay timer illustrated by block 510 is started. It issues a time-out event when the delay has passed. Block 512 represents a determination of whether or not the interrupt request counter has reached a predetermined value. If yes, an event is issued to block 514 illustrating a logical OR between the positive event of the determination of block 512 and the positive event of a block 516 illustrating a determination of whether or not the result of a logical AND computed in block 518 is positive.

Block 518 receives the time-out event from the delay timer of block 510 and a negative event of a determination of block 520 of whether or not an execution tag registry (of FIG. 2) is available. If either the determination of block 516 or the determination of block 512 is yes then the process passes to block 522 representing the step that an interrupt request is issued to one of the CPUs and the message data is forwarded to the CPU. This specific routine is in place to indicate situations in which the IPP is not available or busy and, for this reason, cannot process the respective message request at this point of time. In this specific case, the message will be forwarded 'unprocessed/as is' to one of the CPUs.

Returning the focus to block 506, the process continues at block 524 where the IPP transition storage (cf. FIG. 2) is accessed and an execution tag registry is allocated. The latter also happens, if the time-out event has not yet happened when the process reached block 514.

In case an execution tag registry is available, as determined in block 520, the process continues to block 526 illustrating the step of initiating and preparing the execution tag registry. At the same time the status flag of block 508 is set to 'ready'. From block 526 the process continues to the starting block 600 of the flow chart shown in FIG. 6 as depicted by block 528.

Figure 6:
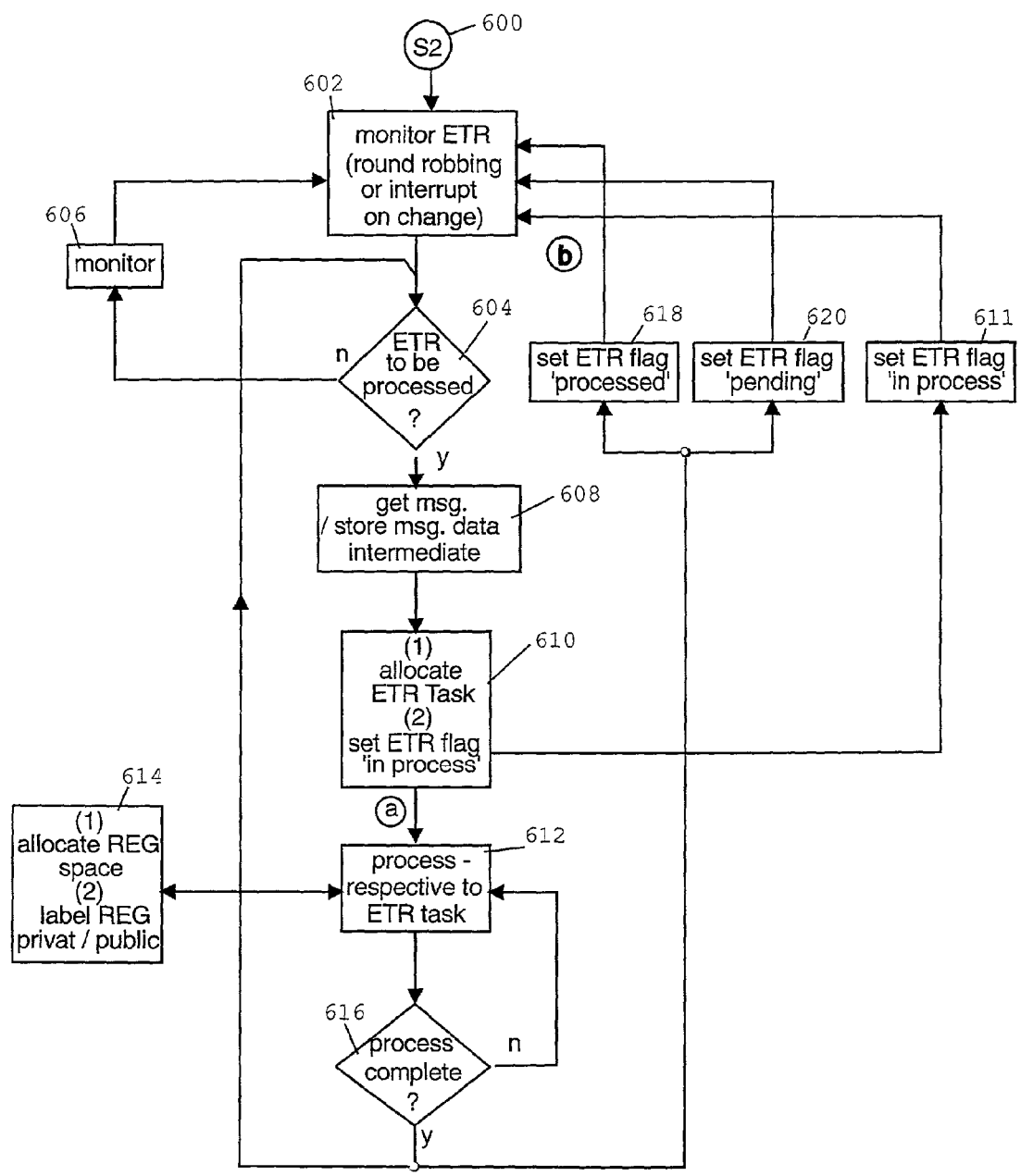
FIG. 6 shows a flow chart illustrating the message processing in an dynamic process of the message processing as illustrated in FIG. 4.

Now with reference to FIG. 6, there is depicted a flow chart illustrating the message processing in an dynamic process of the message processing as illustrated in FIG. 4. Block 600 illustrates the starting point of the present process which is reached when the process shown in FIG. 5 passes to block 528. From block 600 the process immediately proceeds to block 602 illustrating that the execution tag registry is monitored. This might be done by either using a round-robin procedure, or a procedure spontaneously issuing an interrupt signal whenever a change occurs in the execution tag registry.

Then the process reaches a determination illustrated as block 604 of whether or not there is an execution tag registry to be processed. If not, the process returns to block 602 after it monitored again the execution tag registry as illustrated by block 606. If yes, the process passes to block 608 indicating that the message is retrieved and intermediately stored. Then block 610 is reached where an execution tag registry task is allocated and an execution tag registry flag is set to "in progress", as also illustrated by block 611. In the following, in block 612, the message data is processed in accordance to the execution tag registry task.

The execution tag registry task might be one or more of the following tasks, in particular: storing message data, initializing a timer, comparing a timer, counting an event or an occurrence, comparing an event or an occurrence, performing a Boolean operation, assembling new messages. During the processing of the execution tag registry task the register pool (cf. FIG. 2) is accessed, block 614, and a register space is allocated as well as the respective register space is labeled "private" or "public" depending on the wanted access rights to the register space.

The determination in block 616 checks whether or not the processing is complete. If not, the process returns to block 612. If yes, the process returns to block 604 and the execution tag registry flag is set to "processed", as depicted in block 618, if there is nothing more to do. In case the processing of the present message data is completed, but the process started a counter and needs to wait for more messages, then the execution tag registry flag is set to "pending" as shown in block 620. However, the block is returned to block 602 from all blocks 611, 618 and 620.

Figure 7:
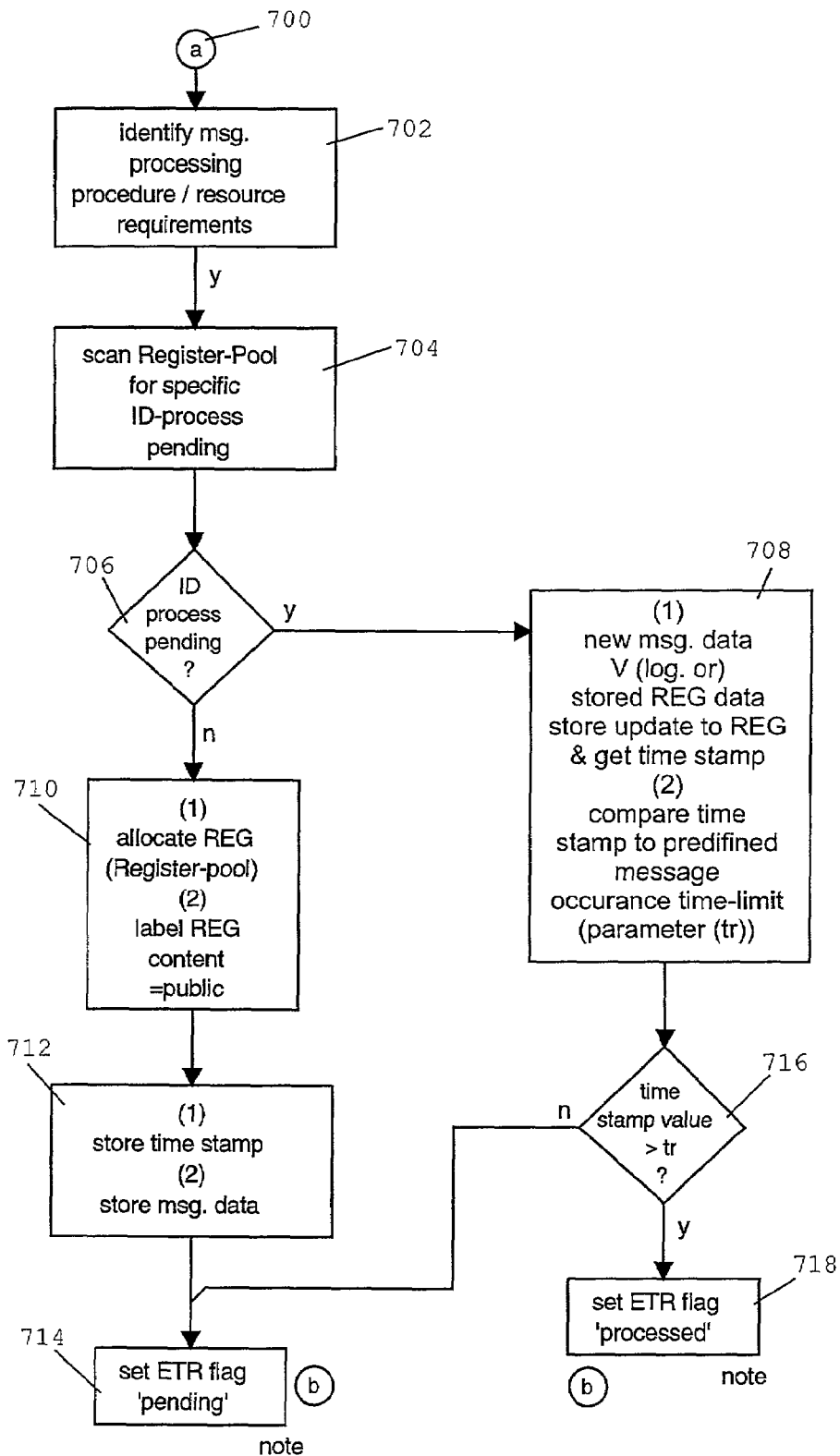
FIG. 7 shows a flow chart illustrating the message processing of an execution unit process of the message processing as illustrated in FIG. 6.

FIG. 7 pictures a flow chart illustrating the message processing of an execution unit process of the message processing as shown in FIG. 6 in greater detail. Block 700 forms the entry point, it corresponds to the transition to block 612 of FIG. 6 as indicated by the letter "a" in a circle. First, a message processing procedure is identified and the resource requirements are determined as pictured by block 702. Then, the process continues by scanning the register pool for a pending process that corresponds to the process identified by the message data to be processed as illustrated by block 704. Next, the process reaches block 706 which indicates a determination of whether or not a matching process ID has been found in the register pool. If yes, the process branches to block 708 in order to allocate necessary registers. A typical operation performed at this point can be, for example, storing the resulting data of a logical operation or of a function. The respective OR-function would be using the new message data as the first parameter and the present register data contend as the second parameter. If necessary a time stamp is applied to the newly created entry. Furthermore, the time might be compared to a predefined instant of time to determine whether or not a message occurrence time limit has been reached or not.

If no, block 710 is reached standing for the step of allocating a register pool space and label the particular register space as being "public". Then in block 712, first, a time stamp is stored and, second, the message data is stored, finally, the execution tag registry flag is set to "pending" as indicated by block 714.

From Block 708 the process passes to a determination, block 716, of whether or not the time stamp value is greater than a parameter "tr", whereby the parameter "tr" is equal to the time period of a message occurrence to be evaluated and processed, respectively. If no, the process branches to block 714. If yes, the process continues to block 718 depicting the step of setting the execution tag registry flag to the value "processed". From block 714 and 718 the process is continued at block 602 of FIG. 6 as indicated by the letter "b" in a circle.

Figure 8:
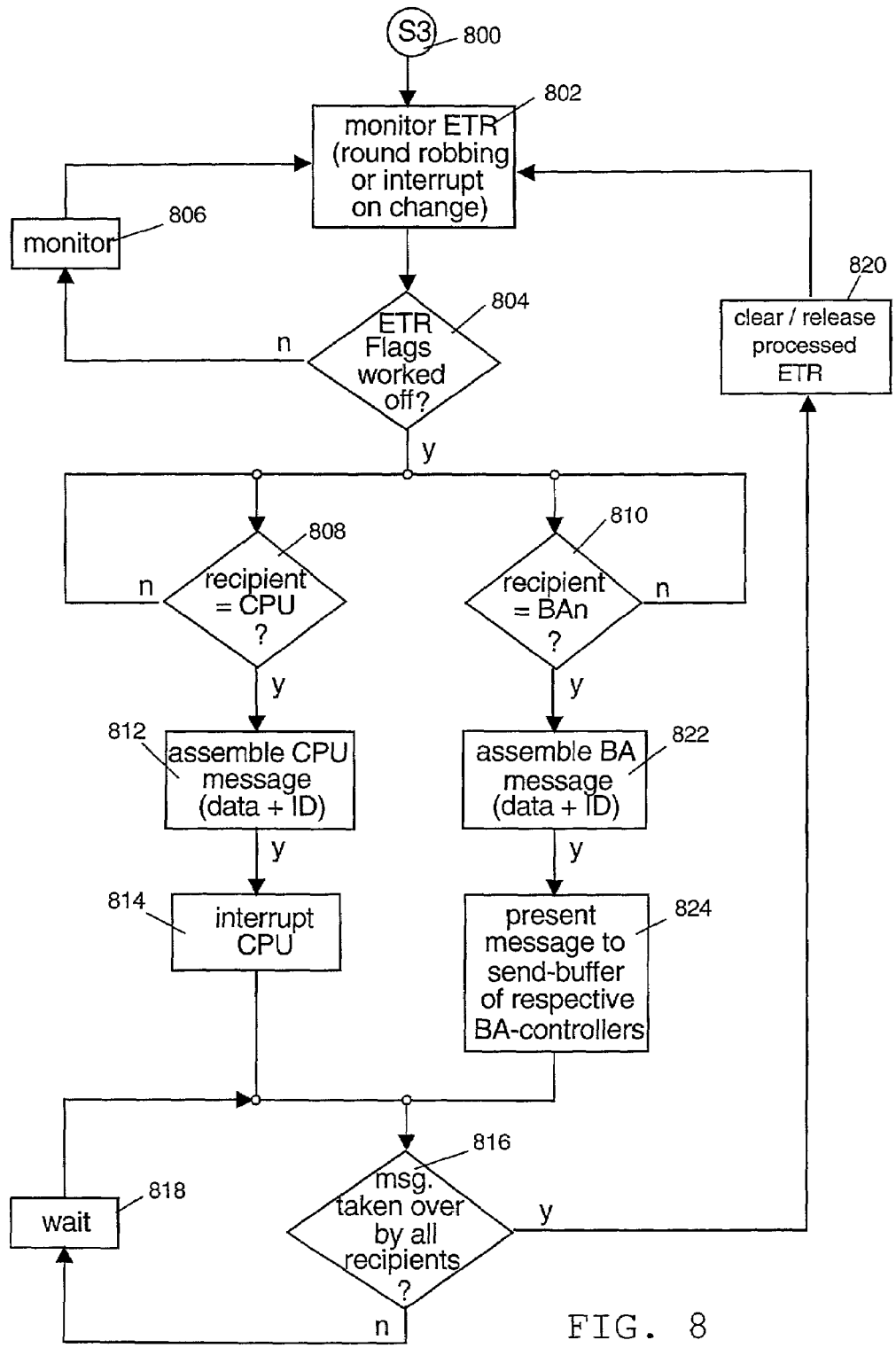
FIG. 8 shows a flow chart illustrating the message processing of a presentation process of the message processing as illustrated in FIG. 4.

With reference to FIG. 8, there is depicted a flow chart illustrating the message processing of a presentation process of the message processing as shown in FIG. 4. Block 800 illustrates the starting point of the present process which is reached when the process shown in FIG. 4 passes to block 420. From block 800 the process immediately proceeds to block 802 illustrating that the execution tag registry is monitored. This might be done either by using a round-robin procedure or a procedure directly issuing an interrupt signal whenever a change occurs in the execution tag registry.

Then, the process reaches a determination, illustrated as block 804, of whether or not there is an execution tag registry flag indicating that the corresponding process is concluded. If not, the process returns to block 802 after it monitored again the execution tag registry as illustrated by block 806. If yes, the process passes to blocks 808 and 810. Block 808 indicates a determination of whether or not the recipient of the computed message is a CPU. If no, the process returns to blocks 808 and 810. If yes, a CPU message is assembled by combining the message data and an ID as indicated by block 812. Then the process reaches block 814 illustrating an interrupt sent to the CPU in order to notify the CPU of the message to be received. Then, the process reaches a determination of whether or not the message has been taken over by all recipients, block 816. If not, the process returns to block 816 after it was delayed for a predetermined period of time by a wait state illustrated by block 818. If yes, the process passes to block 820 indicating that the respective execution tag registry is cleared and released before returning to block 802.

Coming back to block 810 illustrating a determination of whether or not the recipient of the computed message is one of the bus adapters (of FIG. 2). If no, the process returns to blocks 808 and 810. If yes, a bus adapter message is assembled by combining the message data and an ID as indicated by block 812. Then, the process reaches block 824 illustrating the step of sending the assembled message to a send buffer associated to the respective bus adapter controller. Then, the process reaches the determination of block 816 which has been explained above.

Figure 9:
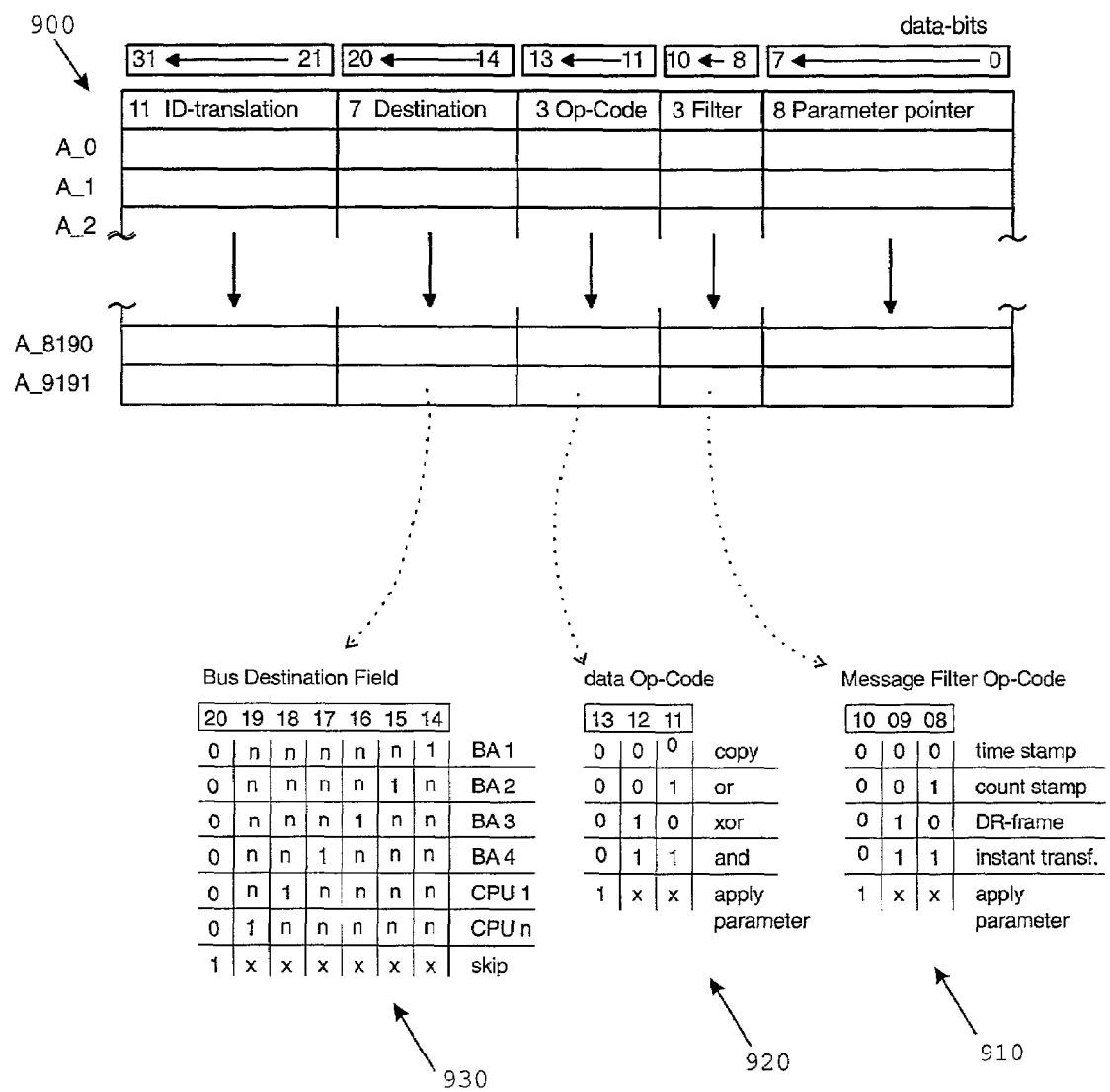
FIG. 9 shows a table depicting the organization of information stored in the intercommunication preprocessor storage sub system.

FIG. 9 shows a table 900 presenting an example of the organization of information stored in the IPP storage sub system 236 of FIG. 2. The storage sub system might be formed by a conventional memory device, e.g., 8192 memory addresses having a storage capacity of 32 bits each as shown in the example according to FIG. 9. The contents of the storage sub system can be set by one of the CPUs connected to the intercommunication preprocessor. Thus, the intercommunication preprocessor can be configured according to the needs of a particular application. However, the information of table 900 can alternatively be stored in more than one table or memory devices. Furthermore, it is acknowledged that the following description of the table is only by way of example and the same or corresponding information might be stored similarly.

The data bits 0 to 7 are used to store a pointer to parameter which are used for the computation of the received data messages. The parameter itself get stored in a dedicated memory device which might also be stored in the IPP storage sub system 236 of FIG. 2. Alternatively, a data field is provided that directly contains the parameter value. The next data bits 8 to 10 are used to encode a message filter operation code (op-code) as illustrated in a message filter op-code table 910.

In the message filter op-code table 910 the values "0" and "1" are binary values, whereas the Letter "n" can be filled either with "0" or "1" for the respective functionality. A letter "x" represents a so called "don't care", i.e., the particular digit can be filled either with "0" or "1" not causing any logical influence to the system. If a memory cell selected by a data message shows the respective binary digits 8 to 10 set to "000", then a time stamp is to be generated during computation of the respective message. In case it is one of the other message filter op-codes, a different operation is meant to be performed, e.g., creation of a count stamp, instant transfer of the message without any further computation or applying of a parameter.

Similarly, the following three bits 11 to 13 are organized. They represent the data operation code as depicted in the data op-code table 920. In accordance with the encoding of the data operation code the contents of the data message is copied, or a Boolean operation, such as OR, AND or XOR (exclusive or), is applied to the message contents. Furthermore, a parameter could be applied to the message. It is understood that in another embodiment different operations might be implemented. However, for more complicated mathematical operations, such as floating point operations, the message could instantly be transferred to one of the CPUs for further computation. The approach of only implementing comparable simple operations in the intercommunication preprocessor helps to keep the hardware implementation effort of the intercommunication preprocessor low.

In the seven data bits 14 to 20 the destination of the message selecting the address cell is encoded, as depicted in a bus destination field table 930. Each of the bits 14 to 19 represents one of the bus adapters or CPUs (cf. FIG. 2) as a destination of the respective message. In case more than one bit is set, the message is transmitted to more than one destination. Only, if bit 20 is set to "1" the message is dropped.

The remaining eleven bits 21 to 31 are used to encode the ID (identification) translation. This is used if the ID of an incoming message needs to be changed before it gets forwarded into, e.g., a different network.

The address at which a particular treatment to be performed with an incoming message is stored corresponds to the ID of the incoming message. Hence, in accordance with the message ID of the incoming message the respective address is selected and the encoded treatment is read out to be stored in the execution tag registry as explained above.

Further advantages of the intercommunication preprocessor according to the present invention are in particular that only a comparably small amount of hardware gates are requirements, leading to low system cost. Furthermore, this reduces the system power consumption, as well as the physical size, and increases the reliability. The intercommunication preprocessor advantageously relieves the load on the master CPU by reducing the workload on the master CPU induced by bridge, router and gateway functions to a minimum. Thus, the CPU has more computation power for the system applications. The functionality of the overall system is increased by powerful message filtering.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversation to another language, code or notation; b) reproduction in a different material form.

Having thus described our invention, what we claim as new, and desire to secure by Letters Patent is:

1. A message processing device for communicating with remote units over at least one data network and with at least one dedicated CPU comprising:
    a first execution unit for receiving a message to be processed from a remote monitoring unit and determining a kind of processing treatment to be performed with the received message based on configuration data of said message processing device and information encoded in the received message;
    a second execution unit comprising at least one process execution unit for executing a process to perform said determined processing treatment on said received message, wherein said second execution unit additionally comprises a first set of registers for storing message specific information specifying the data contents and said determined processing treatment of the received message and wherein said at least one process execution unit comprises three or more process execution units having access to said first set of registers to obtain said message specific information for performing said determined processing treatment and wherein said process execution units are selectively invoked based on the determined processing treatment; and
    a third execution unit for presenting the result of the determined processing treatment to be forwarded to a destination unit comprising at least one dedicated CPU.

2. The message processing device according to claim 1, wherein said first execution unit comprises a memory device for storing control information being used to determine the processing treatment to be performed with the received message.

3. The message processing device according to claim 2, wherein said first execution unit comprises an interface for configuring said memory device with said control information being used to determine the processing treatment to be performed with the received message.

4. The message processing device according to claim 1, wherein said second execution unit comprises a second set of registers being connected to said at least one process execution unit for storing information needed by said process execution unit.

5. The message processing device according to claim 1, wherein said second execution unit is configured to monitor the first set of registers in order to start processing the received message once a process execution unit is available for processing.

6. The message processing device according to claim 1, wherein said third execution unit is configured to monitor a first set of registers in order to start presenting the result of said message processing once the processing of said received message is complete.

7. The message processing device as recited in claim 1, further comprising a switchboard device for providing a communication connection to said data network and to said dedicated Cpu.

8. The message processing device according to claim 7, wherein said switchboard device comprises a multiplexer connected to said first and third execution unit and for providing connections to several bus adapters and said CPU.

9. The message processing device according to claim 8, wherein said switchboard device further comprises an interrupt bus connected to the first execution unit and to several bus adapters and said CPU.

10. The message processing device according to claim 9, wherein said switchboard device further comprises a controller for dontrolling said multiplexer, whereby said controller is configured to be controlled by either said third execution unit or said CPU.

11. The message processing device according to claim 8, wherein said switchboard device further comprises a controller for controlling said multiplexer, whereby said controller is configured to be controlled by either said third execution unit or said CPU.

12. A method for message processing in a system for communicating with remote units over at least one data network and with at least one dedicated CPU the method comprising the steps of:
    receiving a message to be processed from a remote monitoring unit and determining the kind of message processing treatment to be performed with said received message based on configuration data of said message processing device and information encoded in the received message and determining a number of process execution units required to perform said message processing treatment;
    storing message specific information specifying the contents of said received message and said determined message processing treatment of said received message into a first set of registers;
    monitoring at least one process execution unit and said first set of registers in order to start processing said received message once the required number of process execution units are available for processing;
    performing said determined message processing treatment, whereby said processing is executed sequentially, in parallel, or both sequentially and in parallel;
    monitoring said first set of registers in order to start presenting the result of said determined message processing treatment once the processing of said message is complete; and
    presenting the result of said message processing to be forwarded to a destination unit comprising at least one dedicated CPU.

13. The method according to claim 12, further comprising an initial step of storing control information being used to determine the message processing treatment to be performed with the received message.

14. A computer program product stored on a computer usable medium, comprising a computer readable program for causing a computer to perform a method for communicating with remote units over at least one data network having at least one CPU, said method comprising:
    receiving a message to be processed from a remote monitoring unit and determining the kind of message processing treatment to be performed with said received message based on configuration data of said message processing device and information encoded in the received message and determining a number of process execution units required to perform said message processing treatment;

storing message specific information specifying the contents of said received message and said determined message processing treatment of said received message into a first set of registers;

monitoring at least one process execution unit and said first set of registers in order to start processing said received message once the required number of process execution units are available for processing;

performing said determined message processing treatment, whereby said processing is executed sequentially in parallel, or both sequentially and in parallel;

monitoring said first set of registers in order to start presenting the result of said determined message processing treatment once the processing of said message is complete; and presenting the result of said message processing to be forwarded to a destination unit comprising at least one dedicated CPU.

* * * * *